United States Patent
Yukich

(10) Patent No.: US 8,233,032 B2
(45) Date of Patent: Jul. 31, 2012

(54) SYSTEMS AND METHODS FOR CREATING A THREE-DIMENSIONAL IMAGE

(76) Inventor: Bartholomew Garibaldi Yukich, Sherman Oaks, CA (US)

( * ) Notice: Subject to any disclaimer, the term of this patent is extended or adjusted under 35 U.S.C. 154(b) by 462 days.

(21) Appl. No.: 12/481,387

(22) Filed: Jun. 9, 2009

(65) Prior Publication Data

US 2009/0303313 A1 Dec. 10, 2009

Related U.S. Application Data

(60) Provisional application No. 61/060,039, filed on Jun. 9, 2008.

(51) Int. Cl.
*H04N 13/02* (2006.01)
*H04N 13/04* (2006.01)
*H04N 7/14* (2006.01)
*G09F 13/30* (2006.01)

(52) U.S. Cl. ............ 348/48; 348/14.08; 348/52; 40/432

(58) Field of Classification Search .................. None
See application file for complete search history.

(56) References Cited

U.S. PATENT DOCUMENTS

| | | |
|---|---|---|
| 4,901,140 A | 2/1990 | Lang et al. |
| 4,943,851 A | 7/1990 | Lang et al. |
| 4,979,026 A | 12/1990 | Lang et al. |
| 5,954,414 A | 9/1999 | Tsao |
| 6,064,423 A | 5/2000 | Geng |
| 6,072,545 A | 6/2000 | Gribschaw et al. |
| 6,950,153 B2 | 9/2005 | Lane |
| 7,538,797 B2 * | 5/2009 | Li et al. ...................... 348/218.1 |
| 7,689,003 B2 * | 3/2010 | Shannon et al. ............... 382/108 |
| 2002/0105513 A1 * | 8/2002 | Chen ............................. 345/419 |
| 2004/0226200 A1 * | 11/2004 | Salley ............................ 40/432 |
| 2005/0185711 A1 * | 8/2005 | Pfister et al. ............. 375/240.01 |
| 2005/0253924 A1 * | 11/2005 | Mashitani ....................... 348/42 |
| 2006/0171008 A1 | 8/2006 | Mintz et al. |
| 2006/0171028 A1 * | 8/2006 | Oikawa et al. ................. 359/463 |
| 2007/0171275 A1 * | 7/2007 | Kenoyer ..................... 348/14.08 |
| 2008/0024595 A1 * | 1/2008 | Garcia Galarriaga .......... 348/46 |
| 2008/0246757 A1 * | 10/2008 | Ito .................................. 345/419 |

* cited by examiner

Primary Examiner — Wen-Tai Lin
(74) Attorney, Agent, or Firm — Lowry Blixseth LLP; Scott M. Lowry

(57) ABSTRACT

A method for generating and displaying a three-dimensional image viewable from different angles includes the steps of generating a plurality of images of a three-dimensional object from a plurality of angles. Each image is displayed from an angle corresponding to the generated angle on a display surface of a screen, typically having a plurality of display surfaces. The screen is rotated such that each viewable angle of each image is displayed at least twenty-four times per second so as to appear constant.

14 Claims, 6 Drawing Sheets

SYSTEMS AND METHODS FOR CREATING A THREE-DIMENSIONAL IMAGE

BACKGROUND OF THE INVENTION

The present invention generally relates to image projection systems. More particularly, the present invention relates to systems and methods for creating a three-dimensional image which appears to be suspended in air and which appears to be solid such that the different portions of the image can be viewed as one repositions himself around the image.

Creating images which appear to be suspended in the air are well known. For example, U.S. Pat. No. 4,979,026 to Lang et al. discloses a 360° viewing system for presenting an image in space that is rotated extremely rapidly so that an entire audience, regardless of an individual's position about the viewing system, can view the same image substantially simultaneously and continuously. An electronic image rotation system distorts, processes and rotates an image upon a cathode ray tube and a parabolic mirror arrangement which projects the image from the cathode ray tube to provide a rotating real image in space. A rotatable polarized screen and a separate stationary polarized screen cooperate to define a viewing window which remains continually aligned with the rotating real image in space.

U.S. Pat. No. 4,901,140 to Lang et al. is similar to U.S. Pat. No. 4,979,026, but utilizes a liquid crystal display screen to define a filtered viewing window which is continuously redefined at sequential intervals to remain continually aligned with the rotating real image in space.

U.S. Pat. No. 4,943,851 to Lang et al. discloses another viewing system for presenting a projected image upon a rear projection screen that is rotated extremely rapidly about a vertical axis which exactly bisects the picture in the vertical plane. The rotational rate is such that an entire audience, regardless of their position about the viewing system, can view the projected image simultaneously.

U.S. Pat. No. 6,072,545 to Gribschaw et al. discloses another image rotating apparatus which presents a projected video image upon a rear projection screen that is rotated extremely rapidly about a vertical axis such that an entire audience, regardless of their position about the apparatus can view the projected video image simultaneously. The video image rotating apparatus utilizes light valve technology to create red, green and blue images from an analog composite video signal, and a prism that aligns the images produced by the light valve for projection through an optical system. The image produced by the light valve is rotated in synchronization with the rotation of the projection screen.

U.S. Pat. No. 6,950,153 to Lane discloses a video imaging rotating apparatus which includes a rear projection screen rotatably disposed in a generally horizontal plane. Thus, only a single mirror which is angularly positioned over the screen can be used to project the video images to viewers.

Although the foregoing patents disclose various systems and methods for creating a video image such that an audience, regardless of their position about the apparatus, can view the same projected video image simultaneously, all of the foregoing systems and methods attempt to replicate what would be the equivalent of a television screen image. That is, the image is substantially two dimensional in character such that each member of the audience, regardless of position, views the exact same angle or image. Thus, for example, if a front of a car were being projected as an image, every audience member seated around the apparatus would view the front of the car nearly simultaneously. Thus, while these methods and systems overcome the disadvantage of having a single television screen associated with conventional image displays, these methods and systems do not present a true three-dimensional image in which various angles of the image can be viewed by repositioning the viewing angle of the individual viewing the image.

The creation of three-dimensional objects on a conventional two-dimensional display, such as a computer monitor or television is well known. However, only those immediately in front of the computer monitor or television screen can view the image, and rotation of the image using software is required to view the various angles of the three-dimensional image. Moreover, such methodologies and systems do not give the appearance of a three-dimensional object being suspended in space and viewable from different views and angles in all directions of a 360° angle by multiple members of an audience simultaneously.

Another well known three-dimensional approach is for the user to wear filtering glasses which present a stereoscopic-type display, wherein images from the television or projector screen appear to be three-dimensional. Once again, the viewer must be positioned immediately in front of the screen, and furthermore must wear the specially designed glasses in order to view such images, and the three-dimensional images are limited to the viewing angle in which they are created.

One of the earlier approaches of displaying a volumetric three-dimensional image was by the use of a Varifocal mirror. This consisted of a vibrating mirror and a stationary cathode ray tube (CRT). A series of cross-sectional images are displayed in sequence on this CRT, which, as viewed through a flexion from the vibrating mirror, form a volumetric three-dimensional image. However, this approach has a very limited view angle because the images are inside of the mirror.

Another type of display utilizes a rotating or reciprocating light emitting diode (LED) matrix. A sequence of two-dimensional cross-sectional images are displayed as the LED matrix rotates or moves in space to create the three-dimensional images. However, moving large area LED panels at high frequency creates reliability problems and signal coupling issues.

Another type of volumetric three-dimensional display uses the intersecting light spot of a scanning laser beam, or other electron beam, on a moving screen or disk which sweeps across a volume to generate three-dimensional images. However, such point scanning methodologies are seriously limited by data rate, resolution, brightness and color. As a result, only wire frame or course bit images are possible.

U.S. Pat. No. 5,954,414 to Tsao discloses an approach for displaying volumetric three-dimensional images. The method projects a series of frames of two-dimensional images, through an optical mechanical image delivery system, onto a translucent screen which moves periodically and sweeps a space. As viewed from outside the space, the series of two-dimensional images distributed in the space form a volumetric image because of the after-image effect of human eyes. Thus, many viewers can walk around the space and see the image from many angles simultaneously without wearing any kind of glasses.

U.S. Pat. No. 6,064,423 to Geng also discloses a process and system for creating volumetric three-dimensional images. The process and system utilizes a sequence of helical slices of three-dimensional data to generate a series of two-dimensional images on a reflective surface of a light modulator. These are projected into a volumetric three-dimensional space display using an illumination light source and projection optics. Once again, a three-dimensional image is generated which can be viewed from any angle in a walk-around manner without utilizing any viewing aids.

U.S. Patent Publication No. US 2006/0171008 A1 to Mintz et al. discloses another three-dimensional hologram display system. The projector device projects an image upon the display medium to form a three-dimensional hologram. The three-dimensional hologram is formed such that a viewer can view the holographic image from multiple angles up to 360°.

Although the Tsao, Geng and Mintz et al. processes and systems create a three-dimensional image which appears to be suspended in air and which can be viewed from 360°, the problem with such images is that they are holograms, meaning that they are transparent such that one views the front and back of the image at the same time. Thus, although a three-dimensional image is presented, it is clear to the human eye that such an image is not real, and instead appears to be holographic or transparent in nature.

Accordingly, there is a continuing need for systems and methodologies for creating a three-dimensional image which appears to be suspended in space, and which many viewers can walk around the space and see the image from multiple directions simultaneously without wearing any kind of glasses, and in a manner such that the angle of the image appears to be solid and realistic. The present invention fulfills these needs, and provides other related advantages.

SUMMARY OF THE INVENTION

The present invention resides in a method, and related systems, for generating and displaying a three-dimensional image viewable from different angles. In accordance with the methodology of the present invention, a plurality of images of a three-dimensional object are generated from a plurality of angles. Each image is displayed from an angle corresponding to the generated angle on a display screen, which is rotated such that each viewable angle of each image is displayed at least twenty-four times per second. Typically, means are provided for blocking viewing of the screen such that each image on the screen is viewable only when viewed on the display surface of the screen.

In accordance with the present invention, a plurality of cameras are positioned at predetermined angles around the three-dimensional object. The image of the three-dimensional object is captured or generated from the angle of each of the cameras.

A plurality of image projectors are positioned in fixed position at angles relative to the screen corresponding to the angles of the cameras and three-dimensional object used to generate the images of the three-dimensional object. The image projectors continuously project an image of the object as captured by the corresponding camera towards the screen. So that only an image, or an angle of the image, is viewable when a display surface of the screen is facing the viewer, a wall is positioned between the image projectors and the screen. The wall is rotated at the same rate as the screen, and includes view ports formed therein that are substantially aligned with the display surfaces of the screen. The wall may be defined by a housing which substantially encompasses the screen such that the display surfaces of the screen are only viewable through the view ports of the wall of the housing.

Other means for blocking viewing of the screen include placement of a lenticular lens in front of the display surfaces of the screen. Such blocking means may also comprise a plurality of spaced apart members positioned in front of the display surfaces of the screen. Typically, such members are vertically oriented with respect to the display surface of the screen so as to create a vertical blind structure. In a particularly preferred embodiment, the screen comprises a plurality of display surfaces, such that a corresponding plurality of view ports are formed in the wall, and/or a plurality of blocking means are positioned in front of each of the display surfaces of the screen.

In one embodiment, the screen comprises a plurality of electronic screens capable of displaying digital images thereon. The screens are rotated and digital images are provided to each electronic screen for display at predetermined intervals, such that the images are displayed at least twenty-four times per second.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in systems and methods for creating a three-dimensional image allowing a viewer to walk around and see the image from front and back and all sides, or around 360° of viewing. The present invention creates the illusion of a three-dimensional image without having to wear special glasses, and is different from a three-dimensional volumetric display, as volumetric images are more like transparent holograms. As will be more fully explained herein, the present invention is actual film or digital photography or three-dimensional animation which is recorded or rendered from a number of angles and projected on a spinning screen at the same angles.

As will be more fully described herein, there are different methodologies of accomplishing this. However, all of the methodologies include the common points of the screen spinning very fast, such that every image or angle should be displayed at least twenty-four frames per second. Moreover, the screen should only be viewable when in its rotation it is perpendicular to the viewer. Finally, the material displayed needs to be created to match the number of captured image angles used.

Figure 1:
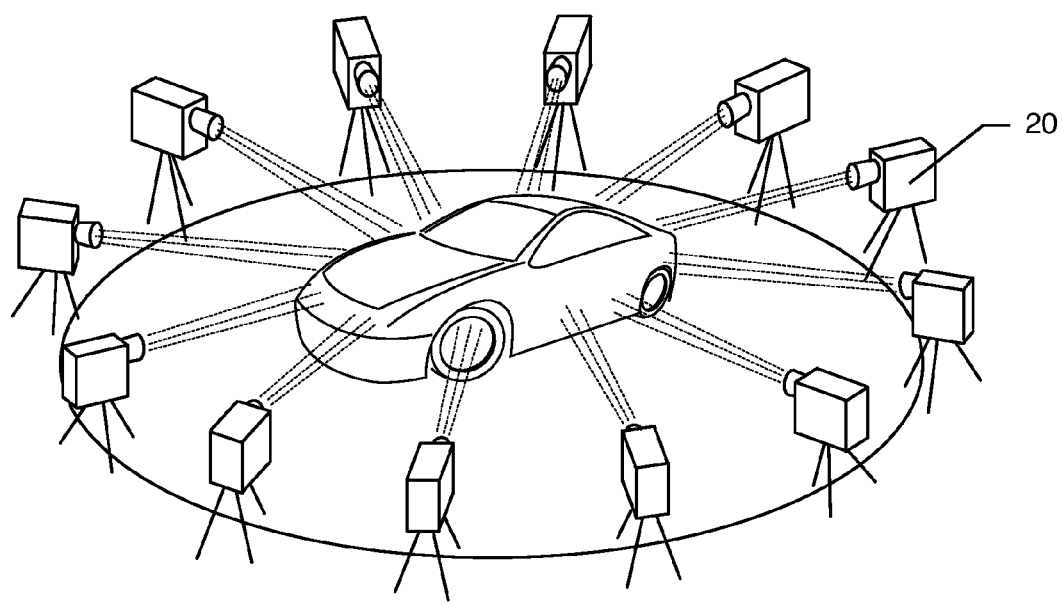
FIG. 1 is a diagrammatic perspective view of a three-dimensional object having a ring of cameras capturing images from different angles of the three-dimensional object, in accordance with the present invention.

The first step of the invention is to generate a plurality of images of a three-dimensional object from a plurality of angles. This can be done in a manner of ways. As indicated above, the three-dimensional object can be created from animation, that is, on a computer or the like. Alternatively, a three-dimensional object can be a real object which has images taken thereof from various angles, such as using film or digital photography. FIG. 1 illustrates an exemplary real three-dimensional object 10 in the form of an automobile. A plurality of cameras 20 are positioned around the car so as to capture or generate images from a plurality of angles. In a preferred embodiment, the cameras 20 are positioned on substantially the same plane and equally spaced apart from one another. FIG. 1 illustrates, for exemplary purposes, twelve cameras 20 spaced evenly apart so as to completely encircle the automobile 10. Thus, each camera 20 is spaced thirty degrees apart from the adjoining camera 20. Although fewer cameras 20 can be utilized, the larger number of cameras provide increased viewing angles so as to generate a seamless, realistic looking three-dimensional image of the object 10. Thus, for example, if thirty-six cameras 20 were utilized, they would preferably be spaced ten degrees apart from one another on the same plane. The cameras 20 need not necessarily be on the same plane, however, as will be described more fully herein, if cameras 20 take footage so as to capture and generate images from different planes or angles, there must be a corresponding projector and display surface of a screen to correspond with the camera's angle and location. However, in order to create a full three hundred sixty degree image of the object 10, the photographer would need to place a plurality of cameras 20 so as to completely surround the object 10.

Figure 2:
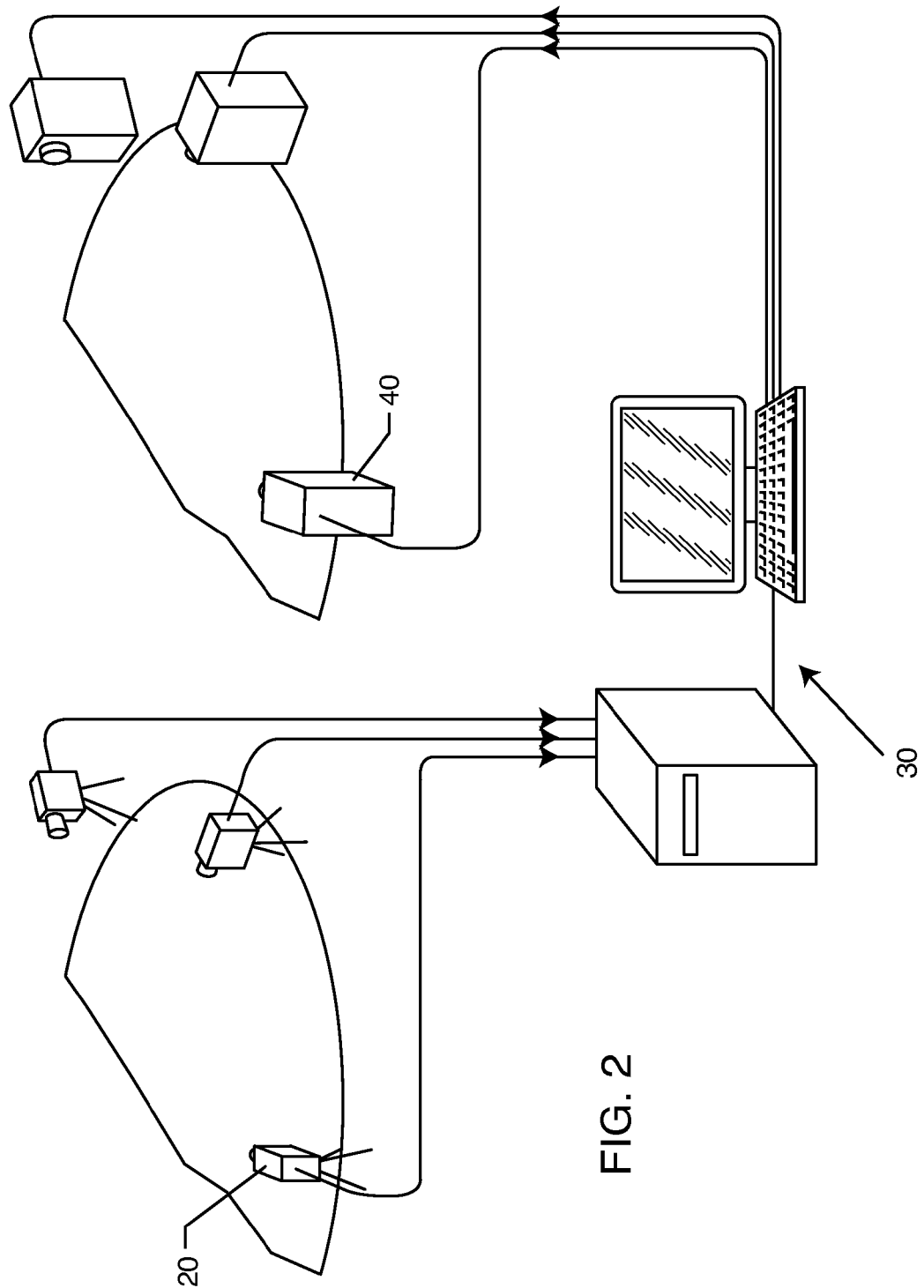
FIG. 2 is a diagrammatic view illustrating the processing of the generated images, and subsequent projection of the captured images, in accordance with the present invention.

With reference now to FIG. 2, the generated or captured images are transferred to a computer system 30 having software capable of playing back an unlimited number of streams of video in synchronization. Thus, the images, whether they be still photographs or more preferably video footage, is transferred to the computer 30 for processing. If film photography is used in the first step, then film photographs must be converted to digitized signals or files for importation into the computer 30 so that the software can manipulate the data. Software capable of playing back in an unlimited number of streams of video and synchronization currently exist, and is often used for music concerts or trade shows. One such software application is called by the brand name Renewed Vision™.

With continuing reference to FIG. 2, the computer 30 feeds projectors 40 for projection onto a display screen of a display system, as will be more fully described herein. The computer will send a corresponding stream of data to each projector 40 which corresponds with the images captured or generated by a camera 20 at that particular location or angle, as will be more fully described herein. Typically, the projectors 40 continuously project an image of the object 10 as captured by the corresponding camera 20 towards a display screen. This projected image is synchronized and timed with the other images which are to be projected and displayed, as will be more fully described herein.

Figure 3:
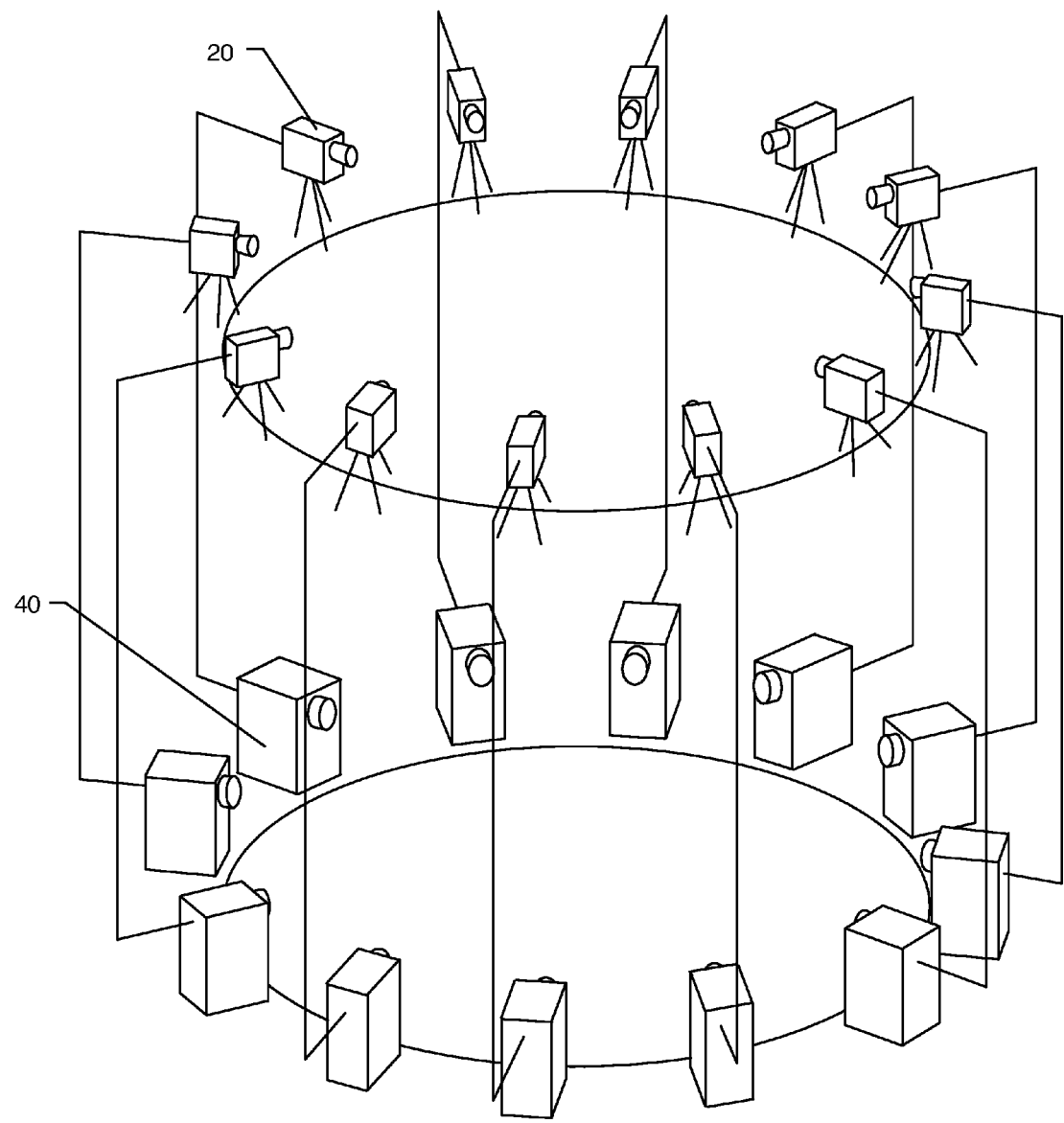
FIG. 3 is a diagrammatic view illustrating the relationship between the image projectors and the cameras, in accordance with the present invention.

With reference now to FIG. 3, in accordance with the present invention, in the embodiments which utilize projectors 40, the ring of projectors 40 match the number and ring of cameras 20. If the cameras 20 were formed in a perfect circle and spaced apart thirty degrees from one another, as illustrated, the projectors 40 will be formed in a perfect circle and spaced apart thirty degrees from one another so as to match the cameras 20 and their respective angles. As illustrated in FIG. 3, twelve cameras 20 were used to capture or generate images of the three-dimensional object 10 in FIG. 1. Thus, in accordance with the present invention, a corresponding twelve projectors 40 would be placed at the exact same position or angle as a corresponding camera 20 so as to project and display the captured image from the corresponding camera 20 angle.

Figure 4:
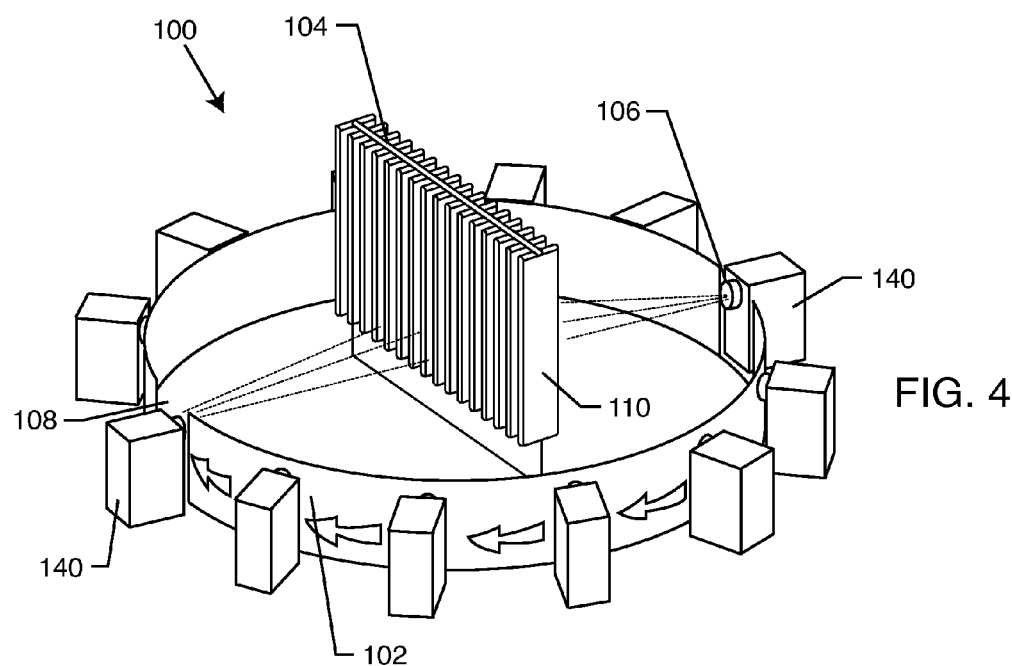
FIG. 4 is a perspective view of an image projection system embodying the present invention.
Figure 5:
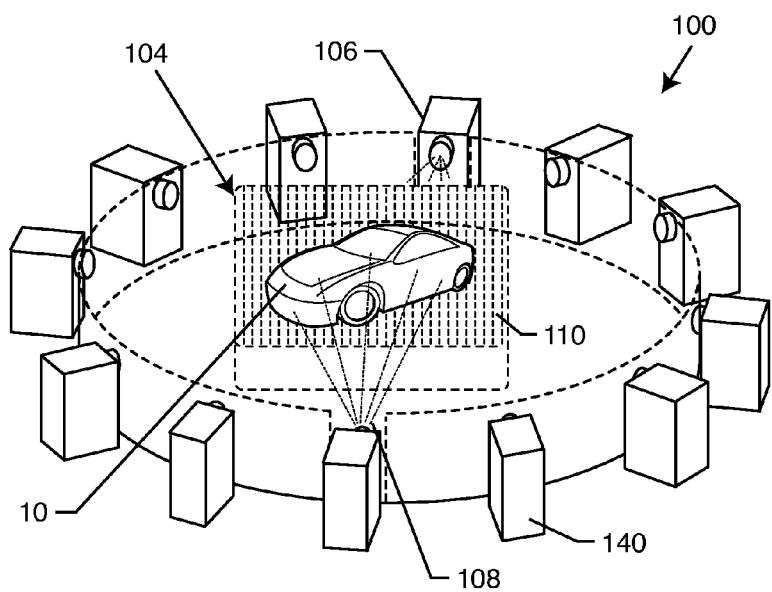
FIG. 5 is a view similar to FIG. 4, illustrating the viewing of an image of the three-dimensional object on the rotating screen as the rotating screen and wall present a viewable angle, in accordance with the present invention.

With reference now to FIGS. 4 and 5, a projection system 100 is shown that embodies the present invention. The system generally comprises a cylindrical structure 102 forming a wall which is positioned between the projectors 1 40 and a screen 104 disposed within the generally circular wall 102. The screen 104, as illustrated in FIGS. 4 and 5 has two sides, or two display surfaces. However, it will be appreciated by those skilled in the art that the screen can have additional facets so as to include three display surfaces, four display surfaces, etc. The screen 104 can be of any type of screen which is capable of having projected images shown thereon and which can be rotated at a fairly high speed.

The cylindrical wall structure 102 is preferably comprised of a rigid, but lightweight material. The wall 102 can be smooth and cylindrical, or multi-faceted depending upon the need and desire of the design. Both the wall 102 and the screen 104 are rotated, such that a display surface of the screen 104 passes the same angle at least twenty-four times per second.

It will be seen that the wall includes two viewing ports or openings 106 and 108 formed therein. These viewing ports 106 and 108 correspond to the two opposite display surfaces of the screen 104, and are in constant alignment therewith. The screen 104 and the wall 102 may be rotated together, or independently, but at the same rate of speed and in synchronization such that the viewing ports 106 and 108 continuously are aligned with the opposite display surfaces of the screen 104. The wall structure 102 is configured to prevent projection of images from the individual projectors 1 40 onto the screen 104 at all times other than when the projector 104 is in alignment with a viewing port 106 or 108. For that fraction of a second, the image which is fed to projector 140 is projected onto one of the display surfaces of the screen 104. At all other times, the projectors 104 typically continuously project an image, however, this image or footage is projected onto the exterior surface of the wall 102, which is typically opaque such that the image is not viewed by the viewer. The wall 102 and the screen 104 are spun at a high velocity, such that each face or display surface of the screen 104 is displayed at least twenty-four times per second so as to create a twenty-four frames per second viewing angle, which the human eye views as being constant and uninterrupted. Any acceptable means of rotating the screen 104 and the wall 102 which are known in the art are contemplated by the present invention, the important aspect being that the faces or display surfaces of the screen 104 be constantly in alignment with the openings or view ports 106 and 108 of the cylindrical wall 102.

The projectors 140 are fixed in position, so as to correspond with a camera 20 which generated or captured the image of a three-dimensional object which the particular projector 140 typically continuously projects, and the projectors 140 do not spin. Moreover, in the typical embodiment, each projector 140 continuously projects the same image or footage. Preferably, the outer surface of the cylindrical wall 102 is a flat opaque black color, such that the image from each projector 140 is only seen when the image is shown through one of the view ports 106 or 108 and on the projector screen 104.

Thus, each projector 140 emits or projects a stream of video footage, typically the same image, continuously. The type of projector is not important to the invention. The spinning flat black wall 102 allows the viewer to see only the projection from the projector 140 they are directly in line with as they walk around the ring of projectors 140. Thus, they see the three-dimensional image 10 from different projectors one at a time, each at a different viewing angle of the image, as generated or captured by the cameras 20, as illustrated in FIG. 1. The remaining projectors' images are blocked by the walled cylinder 102 when the projector 140 is not in alignment with one of the viewing ports 106 and 108. As the screen 104 and the walled cylinder 102 rotate together, the display surfaces of the screen 104 are only visible through the two viewing ports 106 and 108, which are positioned generally one hundred eighty degrees opposite from one another. Of course, the same image is projected through the viewing port 106 or 108 from each projector 140 as the viewing port 106 or 108 passes each projector 140. Thus, an individual viewing the object 10 at a given position will see the same image.

However, if that individual moves around the assembly 100, the individual will see different viewing angles of the image 10. For example, if the viewer was positioned at the front of the assembly 100, as illustrated in FIG. 5, the viewer will view the front image of the car 10. However, an individual positioned directly opposite the assembly 100 so as to be viewing a display surface of the screen 104 from generally the opposite angle would view the rear of the car. As the individual walked around the projector assembly 100, the viewer would see one side of the car, the back side of the car, the opposite side of the car, and then the front of the car as he or she walked around the entire assembly 100. As the image is projected onto a screen, the image 10 will appear to be solid and not holographic or ghost-like. Moreover, due to the high rate of spin of the cylindrical wall 102 and the screen 104, the projected image would appear to be suspended in air and perfectly three-dimensional.

In order to give the appearance of a continuous image, as described above, the image from each angle should be shown at least twenty-four times per second. Given the two-sided screen 104 illustrated in FIGS. 4 and 5, the screen 104 and the wall 102 would need to be rotated at least twelve rotations per second for the two-sided screen 104. In this manner, standing behind a projector 140 would yield the image being displayed on a display surface of the screen 104 at least twenty-four times per second.

With continuing reference to FIGS. 4 and 5, in order to preserve the quality of the image 10 viewed, the image should be viewed on a display surface of the screen 104 when the viewer is facing, such as substantially at a perpendicular angle to, the display surface of the screen 104. As the cylindrical wall 102 illustrated in FIGS. 4 and 5 is sufficiently short so as to enable the screen 104 to be viewable from different angles, the object provides means for blocking viewing of the screen such that the image on the screen 104 is viewable only when viewed substantially at a perpendicular angle to the screen. This can be done in a variety of ways. As illustrated in FIGS. 4 and 5, a plurality of spaced-apart members 110 are positioned in front of opposite display surfaces of the screen 104. This has the effect of vertical blinds, which prevent viewing of the display surface of the screen 104 unless the image is exactly perpendicular to the viewer, as illustrated in FIG. 5. As illustrated in FIG. 4, when the screen becomes non-perpendicular, the members 110 prevent viewing of the display surface of the screen 104. It will be appreciated that a lenticular lens or the like might be substituted for the vertical blind members 110. In this manner, an individual viewing the assembly 100 will not be able to view the image 10 until the image is substantially perpendicular to him or her. Thus, the trueness or clarity of the image 10 is maintained such that if a user positions himself or herself directly behind one of the projectors 140, that individual sees only the view of the image 10 projected from that projector 140, and not any other.

Figure 6:
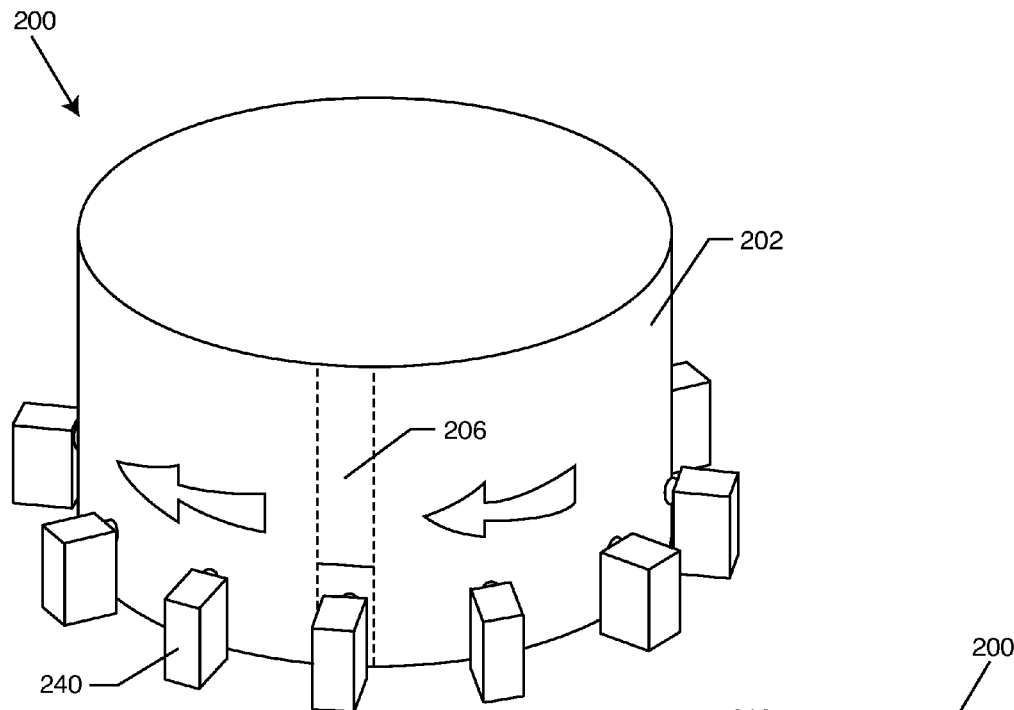
FIG. 6 is a perspective view of another projection system embodying the present invention, with the screen being enclosed within a housing.
Figure 7:
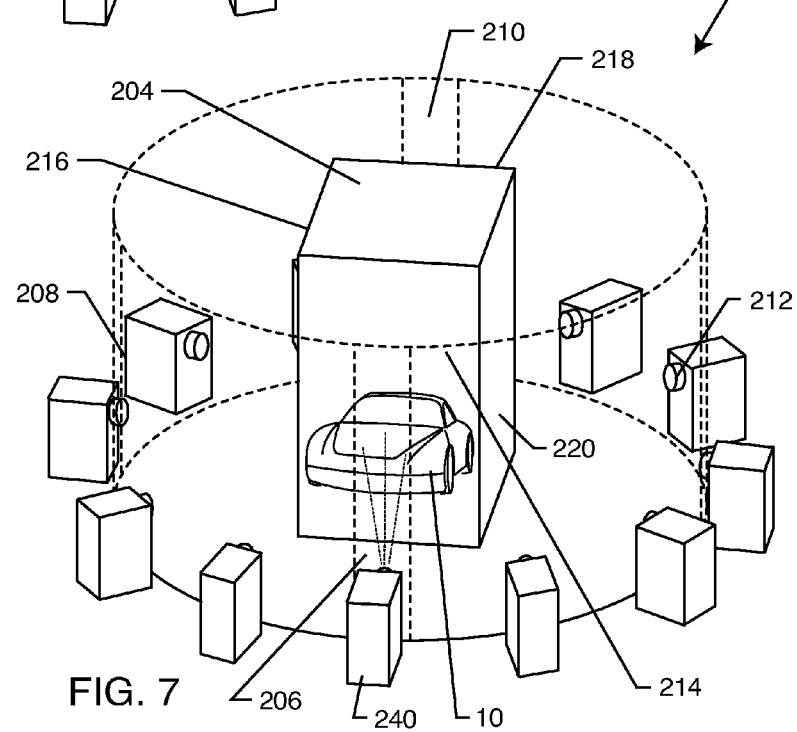
FIG. 7 is a perspective view similar to FIG. 6, but illustrating the housing in phantom so as to view the multi-faceted screen therein.

With reference now to FIGS. 6 and 7, another means of blocking viewing of the display surfaces of the screen such that each image on the screen is viewable only when viewed substantially facing the screen. Thus, the projection assembly 200 illustrated in FIGS. 6 and 7 utilizes a generally cylindrical housing 202 which defines the wall disposed between the screen 204 and the projectors 240 and which prevents the viewers from viewing the screen 204 at all unless positioned into an alignment with one of the view ports 206-212.

It will be noted that the cylindrical wall housing structure 202 in this embodiment has four viewing ports 206, 208, 210 and 212. This is because the screen 204 has four display surfaces 214-220. Thus, the cylindrical wall structure 202 has a viewing port 206-212 which is in alignment with each display surface 214-220 of the screen 204. These viewing ports 206-212 are in constant alignment with the display surfaces 214-220, as described above. If the screen 204 had three display surfaces, then the wall or housing would have a corresponding three viewing ports, etc.

In the embodiment illustrated in FIGS. 6 and 7, there is no vertical blind structure or lenticular lens or the like associated with the screen 204. This is due to the fact that the screen 204 is not capable of being viewed by the viewer unless the viewer views a display surface 214-220 through a viewing port 206-212 as the viewing port 206-212 passes the particular projector 240 which the viewer has positioned himself or herself behind. If there is a sufficiently large number of projectors and the viewing port 206-212 is sufficiently narrow, there is no need for such image blocking means. However, a lenticular lens, vertical blind assembly or the like may be incorporated to prevent all but an exact perpendicular view of a display surface 214-220 of the screen 204. In any event, the particular image 10 from a given projector 240 will only be viewable when the display surface of the screen 204 is substantially aligned with the viewing angle of the viewer.

With continuing reference to FIGS. 6 and 7, and in particular with respect to FIG. 7, in the illustrated example, there are twelve projectors 240 which are equally spaced apart from one another so as to match the ring of cameras 20, as illustrated in FIG. 1. As the screen 204 has four display surfaces, there are four view ports 206-212 formed in the cylindrical housing 202. Thus, the screen 204 and the cylindrical housing 202 must be rotated at least six times per second so that the image 10 from each angle or projector 240 is shown on a display surface 214-220 at least twenty-four times per second.

Once again, as the viewer walks around the projection system 200, and behind a projector 240, a different angle of the three-dimensional object image 10 will be shown. That is, the front of the car, a side of the car, a rear view of the car, an opposite side view of the car, and the front view of the car again if one were to walk completely around the projection assembly 200 and the three-dimensional object were a car, as illustrated in FIG. 1, the image of the car 10 would appear to be solid and real due to the projection onto the screen 204. That is, the object would appear to be as real as one viewing a digital photograph of a front of a car, and then a side of the car, rear of the car, etc. from different angles. The difference being is that the number of projectors 240 and the angles used give the object image 10 a complete three hundred sixty degree viewing angle and image experience so as to appear relatively continuous, solid and real.

Figure 8:
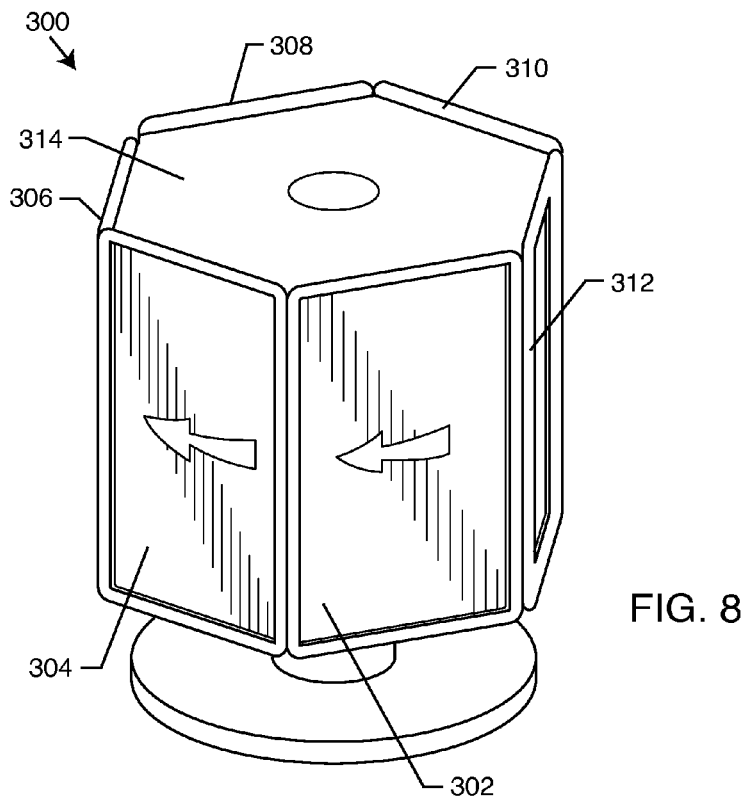
FIG. 8 is a perspective view of another projection system embodying the present invention having a plurality of electronic monitors arranged on a rotatable assembly.
Figure 9:
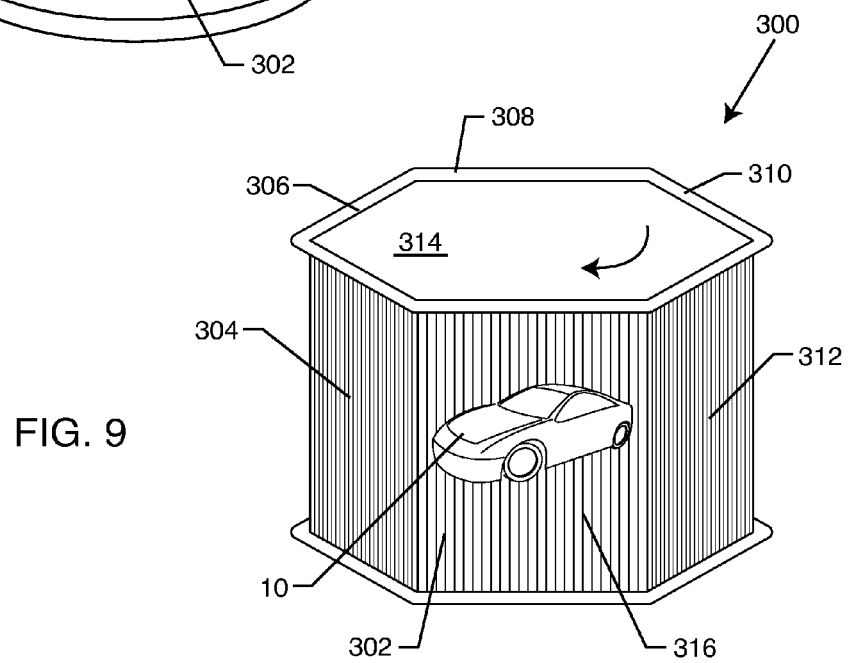
FIG. 9 is a perspective view similar to FIG. 8, illustrating an image of the three-dimensional object viewable on a monitor thereof, in accordance with the present invention.

With reference to FIGS. 8 and 9, in yet another embodiment, a projection assembly 300 includes a plurality of electronic screens 302-312 attached to a housing or framework 314 so as to be rotated at a high speed. It will be appreciated by those skilled in the art that there can be as few as two electronic screens attached back-to-back, or many more. In the illustrated example, there are six electronic screens which are positioned side-by-side such that the front of the screen is directed outwardly to the frame assembly 314.

Preferably, each screen 302-312 will have either vertical blind members, as described above, or a lenticular screen 316, as illustrated, attached thereto so as to prevent viewing of the image 10 from anything other than an exact perpendicular angle to the viewer. Thus, as the screens 302-312 rotate together, they are each only visible when the individual viewing image is directly perpendicular to a particular image angle. That is, they are only viewable when the individual is positioned exactly perpendicular to any given screen 302-312.

Any type of electronic screen or monitor may be used. For exemplary purposes, an LCD screen or screens can be used. Currently, LCD screens can display two hundred forty frames per second (240 Hz). Other LCD screens can display sixty frames per second, or one hundred twenty frames per second. This number, divided by the speed of rotation, will determine the number of viewable angles.

For example, the assembly 300 illustrated in FIGS. 8 and 9 includes six LCD electronic monitors. Thus, in order to obtain at least a twenty-four frames per second speed, such that each image from any given viewing angle will be viewed twenty-four times per second, the assembly 300 of six screens will need to be rotated at at least four times per second, each screen passing the viewing angle four times per second so as to create a twenty-four frames per second image rate. If eight LCD screens were used, the assembly 300 would only need to be rotated three times per second to attain the twenty-four frames per second rate.

Thus, if the LCD screens were 240 Hz monitors, and six LCD screens were placed on the framework 314 and rotated at four times per second, the assembly 300 would have sixty viewable angles (240 Hz÷4 rotations per second). In other words, every six degrees would present a new viewable angle. This would present the maximum viewable angles of the assembly 300. If an assembly 300 were presented with eight LCD monitors, each monitor having a 120 Hz speed, then such an assembly would have forty viewable angles, spaced apart from one another by nine degrees.

As the screens 302-312 rotate, the angle of the image 10 changes to match the angle of rotation. The rotation speed is preferably constant and the material displayed is predesigned to match that speed. That is, the digital images are provided to each electronic screen for display at predetermined intervals. In the examples illustrated in FIGS. 8 and 9, for every six degrees of rotation, the image on the LCD screen 302-312 would change to present a new image if all sixty viewable angles were utilized. In that manner, a viewer standing at a viewable angle would constantly see the same image from the rotating screens 302-312. However, as the viewer moved either to the left or to the right, every six degrees the viewer would view a new angle or image of the three-dimensional object.

More particularly, the image to be recorded may be done in the same way such as utilizing a ring of cameras as illustrated in FIG. 1. However, the number of cameras in playback is determined by the number of screens and speed of rotation. Using the illustrated example of six LCD screens spinning at four rotations per second, each LCD screen playing back two hundred forty frames per second, this yields sixty angles of view at twenty-four frames per second. Thus, sixty cameras set six degrees apart would be necessary to create the footage of the image at the maximum viewing angles. The footage would then be put on the computer 30 and edited together to create six 6° offset movies of the image 10 spinning at the opposite rate of the LCD screens. In other words, four counter-clockwise rotations per second. Software could be used to automate this process. Thus, when the screen 302-312 is spinning, the image 10 appears to be still, due to the opposite rotation of the screen and the image, which can be viewed at all three hundred sixty degree angles as one walks around the assembly 300.

Using the example of an assembly 300 having eight LCD screens, each rotating three rotations per second, and each LCD playing back one hundred twenty frames per second, forty angles of view are yielded at twenty-four frames per second. Thus, forty cameras set nine degrees apart would be necessary to create the footage of the image, which would then be processed using a computer and edited together to create eight nine-degree offset movies of the image spinning in the opposite rate of the LCD screens.

It will be appreciated by those skilled in the art that the systems and methods of the present invention provide a three-dimensional image which appears to be suspended and solid so as to be viewed at all angles as one walks around the device of the present invention. Of course, this could have applications in advertising, medical science, engineering, design, military, etc. The methods and system of the present invention overcome the deficiencies of the prior art in that a true three-dimensional image is created which is not volumetric or ghost-like in nature, but rather appears to be a real solid image.

Although several embodiments have been described in detail for purposes of illustration, various modifications may be made without departing from the scope and spirit of the invention. Accordingly, the invention is not to be limited, except as by the appended claims.

What is claimed is:

1. A method for generating and displaying a three-dimensional image viewable from different angles, comprising the steps of: generating a plurality of images of a three-dimensional object from a plurality of angles; projecting each image onto a display screen from an angle corresponding to the generated angle of that image; rotating the display screen such that each viewable angle of each image is displayed at least twenty-four times per second; and blocking viewing of projected images other than an image on the display screen generally aligned with a viewer thereof, including providing a wall having a view port formed therein substantially aligned with a display surface of the screen, the wall being positioned between an image projector and the screen, the wall being rotated at the same rate as the screen.

2. The method of claim 1, wherein the generating step includes the step of positioning a plurality of cameras at predetermined angles around the three-dimensional object and capturing an image of the three-dimensional object from the angle of each of the cameras.

3. The method of claim 2, wherein the projecting step includes the step of positioning a plurality of image projectors in fixed position at angles relative to the display screen corresponding to the angles of the cameras and three-dimensional object used to generate the images of the three-dimensional object.

4. The method of claim 3, including the step of the image projectors continuously projecting a single image of the object as captured by the corresponding camera towards the screen.

5. The method of claim 1, wherein the wall is defined by a housing encompassing the screen such that the display surfaces of the screen are only viewable through the view ports of the wall of the housing.

6. The method of claim 1, wherein the screen comprises a plurality of display surfaces.

7. A method for generating and displaying a three-dimensional image viewable from different angles, comprising the steps of:
generating a plurality of images of a three-dimensional object from a plurality of angles;
displaying each image from an angle corresponding to the generated angle on a display surface of a screen having a plurality of display surfaces;
rotating the screen such that each viewable angle of each image is displayed at least twenty-four times per second; and
blocking viewing of the display surfaces of the screen such that each image on the screen is viewable only when the display surface of the screen is aligned with a viewer thereof, including the step of providing a wall positioned between image projectors and the screen, the wall being rotated at the same rate as the screen, wherein the wall has view ports formed therein that are substantially aligned with display surfaces of the screen such that the display surfaces of the screen are only viewable through the view ports of the wall of the housing.

8. The method of claim 7, wherein the generating step includes the step of positioning a plurality of cameras at predetermined angles around the three-dimensional object and capturing an image of the three-dimensional object from the angle of each of the cameras.

9. The method of claim 8, wherein the displaying step includes the step of positioning a plurality of image projectors in fixed position at angles relative to the screen corresponding to the angles of the cameras and three-dimensional object used to generate the images of the three-dimensional object.

10. The method of claim 9, including the step of the image projectors continuously projecting an image of the object as captured by the corresponding camera towards the screen.

11. A method for generating and displaying a three-dimensional image viewable from different angles, comprising the steps of: generating a plurality of digital images of a three-dimensional object from a plurality of angles; providing an assembly including a plurality of electronic screens capable of displaying the digital images; rotating the plurality of electronic screens at a sufficient speed to attain at least a twenty-four frames per second viewing rate;
displaying the generated digital images on the electronic screens at predetermined intervals corresponding with the plurality of angles the digital images were generated; and
blocking viewing of the electronic screens display surfaces other than a display surface viewable only when aligned with a viewer thereof.

12. The method of claim 11, including the step of determining a number of angles to generate the digital images or a number of viewable angles of the digital images by dividing the frames per second rate of the electronic screen by the speed of rotation of the electronic screens.

13. The method of claim 11, including the step of determining the speed of rotation of the electronic screens by dividing the frames per second by the number of electronic screens in the assembly.

14. A method for generating and displaying a three-dimensional image viewable from different angles, comprising the steps of:
generating a plurality of images of a three-dimensional object from a plurality of angles, wherein the generating step includes the step of positioning a plurality of cameras at predetermined angles around the three-dimensional object and capturing an image of the three-dimensional object from the angle of each of the cameras;
displaying each image from an angle corresponding to the generated angle on a display screen, wherein the displaying step includes the step of positioning a plurality of image projectors in fixed position at angles relative to the screen corresponding to the angles of the cameras and three-dimensional object used to generate the images of the three-dimensional object;
rotating the screen such that each viewable angle of each image is displayed at least twenty-four times per second;
the image projectors continuously projecting an image of the object as captured by the corresponding camera towards the screen; and
providing means for blocking viewing of the screen other than the display surface is aligned with a viewer thereof, including providing a wall positioned between the image projectors and the screen, the wall being rotated at the same rate as the screen, wherein the wall has view ports formed therein that are substantially aligned with display surfaces of the screen.

* * * * *